(12) United States Patent
Goren

(10) Patent No.: US 9,411,371 B1
(45) Date of Patent: Aug. 9, 2016

(54) SUPPORT STRUCTURE ASSEMBLY FOR SUPPORTING A PORTABLE COMPUTING DEVICE

(71) Applicant: Rick Goren, Fishers, IN (US)

(72) Inventor: Rick Goren, Fishers, IN (US)

(*) Notice: Subject to any disclaimer, the term of this patent is extended or adjusted under 35 U.S.C. 154(b) by 0 days.

(21) Appl. No.: 14/688,498

(22) Filed: Apr. 16, 2015

(51) Int. Cl.
*G06F 1/16* (2006.01)
*B65D 85/00* (2006.01)
*A45F 3/04* (2006.01)
*A45F 5/00* (2006.01)
*H01R 25/00* (2006.01)
*G06F 1/26* (2006.01)
*H04N 9/31* (2006.01)
*A45F 3/14* (2006.01)

(52) U.S. Cl.
CPC ............ *G06F 1/1632* (2013.01); *G06F 1/1662* (2013.01); *G06F 1/1688* (2013.01); *G06F 1/266* (2013.01); *H01R 25/006* (2013.01); *H04N 9/3141* (2013.01); *A45F 3/14* (2013.01); *A45F 2003/148* (2013.01); *A45F 2200/0525* (2013.01); *G06F 1/163* (2013.01)

(58) Field of Classification Search
CPC ......... G06F 1/1632; G06F 1/163; A45F 3/14; A45F 2003/142; A45F 2003/144; A45F 2003/146; A45F 2003/148; A45F 2200/0525
USPC ........................... 361/679.03, 679.41–679.45; 224/259–266, 270; 206/320; 710/303, 710/304
See application file for complete search history.

(56) References Cited

U.S. PATENT DOCUMENTS

| 5,295,089 | A | * | 3/1994 | Ambasz | G06F 1/1628 348/791 |
| 5,724,225 | A | * | 3/1998 | Hrusoff | A45F 3/14 206/305 |
| 5,859,628 | A | * | 1/1999 | Ross | B60R 16/0315 340/990 |
| 6,349,864 | B1 | * | 2/2002 | Lee | A45F 3/14 224/257 |
| 6,354,477 | B1 | * | 3/2002 | Trummer | A45C 3/02 224/153 |
| 6,381,127 | B1 | * | 4/2002 | Maddali | G06F 1/163 224/257 |

(Continued)

FOREIGN PATENT DOCUMENTS

| AU | WO 2012024723 A1 | * | 3/2012 | ............. A45C 11/00 |
| EP | 1494106 A1 | * | 1/2005 | .......... B60R 11/0252 |

*Primary Examiner* — Nidhi Thaker
(74) *Attorney, Agent, or Firm* — Maginot, Moore & Beck, LLP

(57) ABSTRACT

A support structure assembly for supporting a portable computing device includes a harness assembly, a platform, two first step structures, and a support bar. The harness assembly includes a strap and a plurality of connectors extending from the strap. The platform defines a first support surface configured to support the computing device. The two first step structures extend from the platform and are located at opposite ends of the first support surface. Each first step structure defines (i) a first socket formed in a first outer step surface and configured to releasably retain a connector of the plurality of connectors, and (ii) a second support surface opposite from the first outer step surface, non-coplanar with the first support surface, and configured to support the computing device. The support bar is connected to the platform.

10 Claims, 14 Drawing Sheets

(56) References Cited

U.S. PATENT DOCUMENTS

| | | | |
|---|---|---|---|
| 6,659,319 B2 * | 12/2003 | Purpura | A45C 9/00 224/270 |
| 6,772,265 B2 | 8/2004 | Baweja et al. | |
| 7,641,348 B2 | 1/2010 | Yin et al. | |
| 8,358,513 B2 * | 1/2013 | Kim | G06F 1/1626 361/807 |
| 2005/0140941 A1 | 6/2005 | Maddock | |
| 2005/0247584 A1 * | 11/2005 | Lu | A45F 5/00 206/320 |
| 2007/0051766 A1 * | 3/2007 | Spencer | A45C 11/00 224/607 |
| 2007/0199851 A1 * | 8/2007 | Yau | B42D 3/123 206/472 |
| 2009/0078707 A1 * | 3/2009 | Chen | A45F 5/00 220/592.01 |

* cited by examiner

US 9,411,371 B1

SUPPORT STRUCTURE ASSEMBLY FOR SUPPORTING A PORTABLE COMPUTING DEVICE

FIELD

This disclosure relates to portable computing devices and in particular to an assembly for supporting a portable computing device while the device is in use.

BACKGROUND

Portable computing devices, referred to herein as computers, portable computers, laptop computers, or laptops, typically include a base unit and a display screen that is pivotably connected to the base unit. The base unit contains a central processing unit ("CPU"), memory, a battery, and a keyboard. The display screen displays information processed by the CPU, while the keyboard is an input device for inputting and manipulating data. A mouse or other input device is typically connectable to the base unit as a further input device.

Laptops are used by technicians and professionals across a wide range of industries. For example, some medical professionals maintain electronic patient charts and use laptops to access and update the patient charts during a patient visit. The typical medical professional may carry the laptop into the exam room and then place the laptop on a table, desk, countertop, or other support surface during use of the device. Depending on the facility, however, a suitable support surface may be unavailable, thereby making use of the laptop extremely inconvenient. Moreover, in some cases the professional needs to be near the patient without any suitable support surface. In such a situation, the medical professional must support the base of the laptop with one hand and then type or enter data using the other hand. Most professionals prefer to type with two hands and, as a result, data entry errors and a reduction in efficiency occurs when professionals are forced to type with one hand. Of course, professionals in many other fields also benefit from laptops, and are at times without a suitable support surface to place the laptop.

As an additional issue, unlike the monitor of a desktop computer, the display screen of some laptops is difficult for both an operator and an onlooker to observe, since the display screen is typically small and located close to the keyboard in a position that is only convenient for the operator. As a result, it can be difficult for two professionals to collaborate on a project shown on the display screen. Further, it is inconvenient for an onlooker to verify the data that has been entered into the laptop by the operator. In this situation, typically the operator must stop entering data, rotate the laptop towards the onlooker, wait for confirmation from the onlooker, and then move the laptop back into data entry position. Clearly, this process leads to inefficiencies and may result in damage to the laptop during the periods of rotation and movement.

Based on the above, a need exists to make laptops and other portable computing devices even more efficient for use by professionals, technicians, and other users.

SUMMARY

According to an exemplary embodiment of the disclosure, a support structure assembly for supporting a portable computing device includes a harness assembly, a platform, two first step structures, and a support bar. The harness assembly includes a strap and a plurality of connectors extending from the strap. The platform defines a first support surface configured to support the computing device. The two first step structures extend from the platform and are located at opposite ends of the first support surface. Each first step structure defines a first socket formed in a first outer step surface and is configured to releasably retain a connector of the plurality of connectors. Each first step structure also defines a second support surface opposite from the first outer step surface, non-coplanar with the first support surface, and configured to support the computing device. The support bar is connected to the platform.

According to another exemplary embodiment of the disclosure, a support structure assembly for supporting a portable computing device includes a frame, a support bar, a cartridge assembly, a plurality of attachment assemblies, and a harness assembly. The frame defines a support surface configured to support the computing device and includes a first connection structure located opposite of the support surface. The support bar is connected to the frame. The cartridge assembly includes a second connection structure configured to be releasably retained by the first connection structure to connect the cartridge assembly to the frame. The cartridge assembly defines an accessory cavity configured to receive an accessory for use with the computing device. The plurality of attachment assemblies extends from the frame, and each attachment assembly includes an attachment structure. The harness assembly includes a strap and a plurality of connectors extending from the strap. Each connector is configured to be releasably retained by a corresponding attachment structure.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

Figure 1:
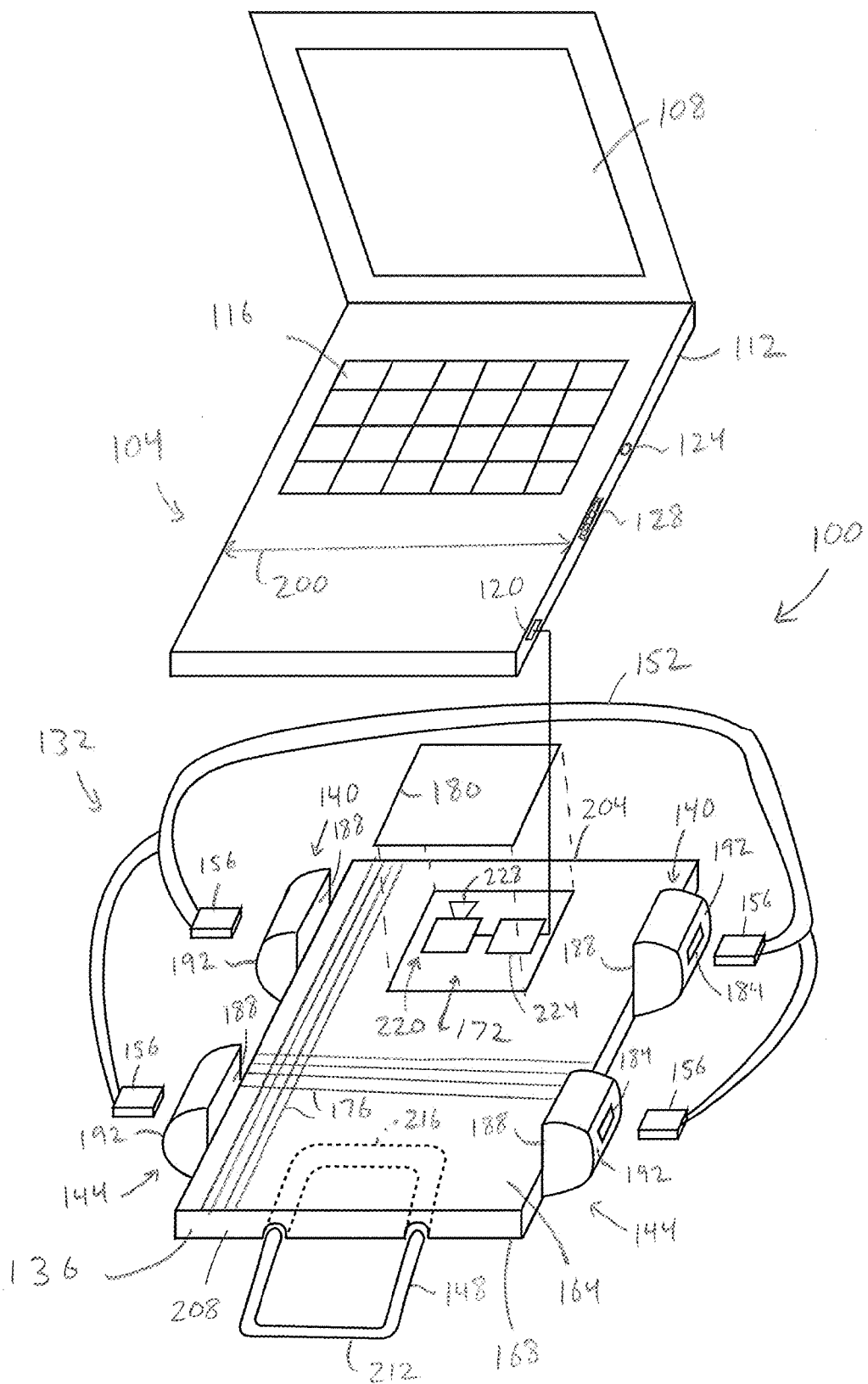
FIG. 1 is a front perspective view of a support structure assembly and a portable computing device, the support structure assembly includes a platform, a harness that is shown disconnected from the platform, and a support bar that is shown in an extended position, the computing device is shown positioned above the platform.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

As shown in FIG. 1, a support structure assembly 100 is configured to support a portable computing device 104, which in the exemplary embodiments is a laptop. The laptop 104 includes a display screen 108 pivotably connected to a base unit 112. The display screen 108 is configured to display data generated by components within the base unit 112. The base unit 112 includes a central processing unit ("CPU") (not shown), memory (not shown), an input device such as a keyboard 116, and output ports such a video output and an audio output. In one embodiment, the video output and audio output are included in a high-definition multimedia interface ("HDMI") port 120. In other embodiments, the video output is provided as any desired output such as a video graphics array ("VGA") port or a digital visual interface ("DVI") port, and the audio output is provided as a socket 124 configured to receive a phone connector. The base unit 112 defines at least one air vent 128 configured to exhaust an airflow used for cooling the CPU.

The support structure assembly 100 is configured to conveniently support the laptop 104 for the user, even when a table, desk, countertop, or other support surface is unavailable. The support structure assembly 100 includes a harness assembly 132, a platform 136, two rear step structures 140, two front step structures 144, and a support bar 148. The harness assembly 132 includes a strap 152 and a plurality of connectors 156 extending from the strap. The strap 152 is flexible and is shaped and sized for support by the upper body of a user. For example, the strap 152 may be configured for support by the user's shoulders and/or neck. The strap 152 may also include a length adjustment feature 160 (FIG. 8) so that the user can select a desired length of the strap. The strap 152 is formed from nylon, cotton, or any other desired material(s) that is strong and durable enough to support a laptop computer. The connectors 156 are attached to the strap 152 and are configured for connection to the step structures 140, 144, as described below.

With continued reference to FIG. 1, the platform 136 defines a first laptop support surface 164, an opposite undersurface 168, and a cavity 172. The support surface 164 is generally planar and is approximately the same size as the base unit 112 of the laptop 104. In some embodiments, the support surface 164 defines a plurality of ribs or ridges 176 extending at least partially across the support surface to promote airflow between the base unit 112 and the platform 136. The platform 136 is typically formed from rigid plastic or metal, such as aluminum, or other suitably rigid but lightweight material.

The cavity 172 is located between the support surface 164 and the undersurface 168. The cavity 172 is configured to receive accessories for use with the laptop, as described below. In one embodiment, a removable cover plate 180 is connected to the platform 136 and is configured to cover at least a portion of the cavity 172 and the accessory(ies) contained therein.

Figure 5:
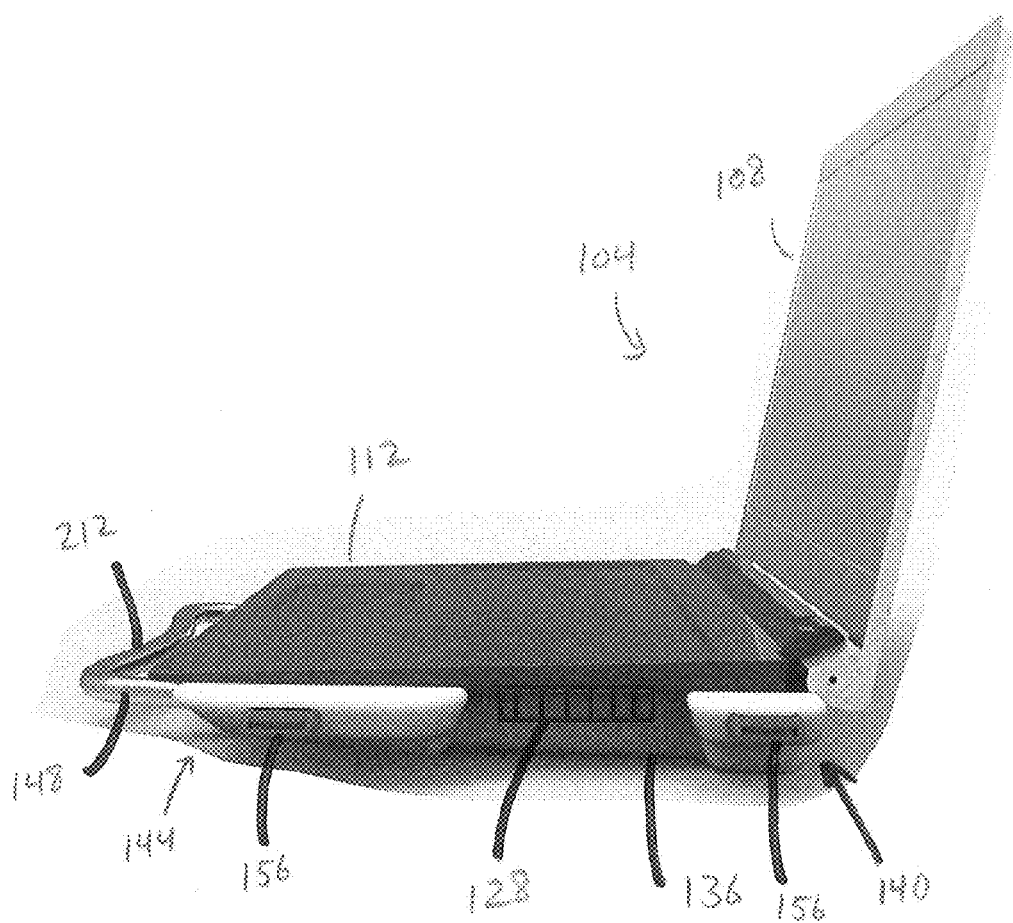
FIG. 5 is a side perspective view of the support structure assembly of FIG. 1 showing the computing device supported on the platform.

The step structures 140, 144 extend from the platform 136 and are configured to further align and support the laptop 104. The rear step structures 140 are located at opposite ends of the support surface 164 from each other. The front step structures 144 are also located at opposite ends of the support surface 164 from each other and are spaced apart from the rear step structures 148, such that the vent 128 of the laptop 104 is unobstructed when the laptop is supported by the platform 136 (see FIG. 5).

Figure 2:
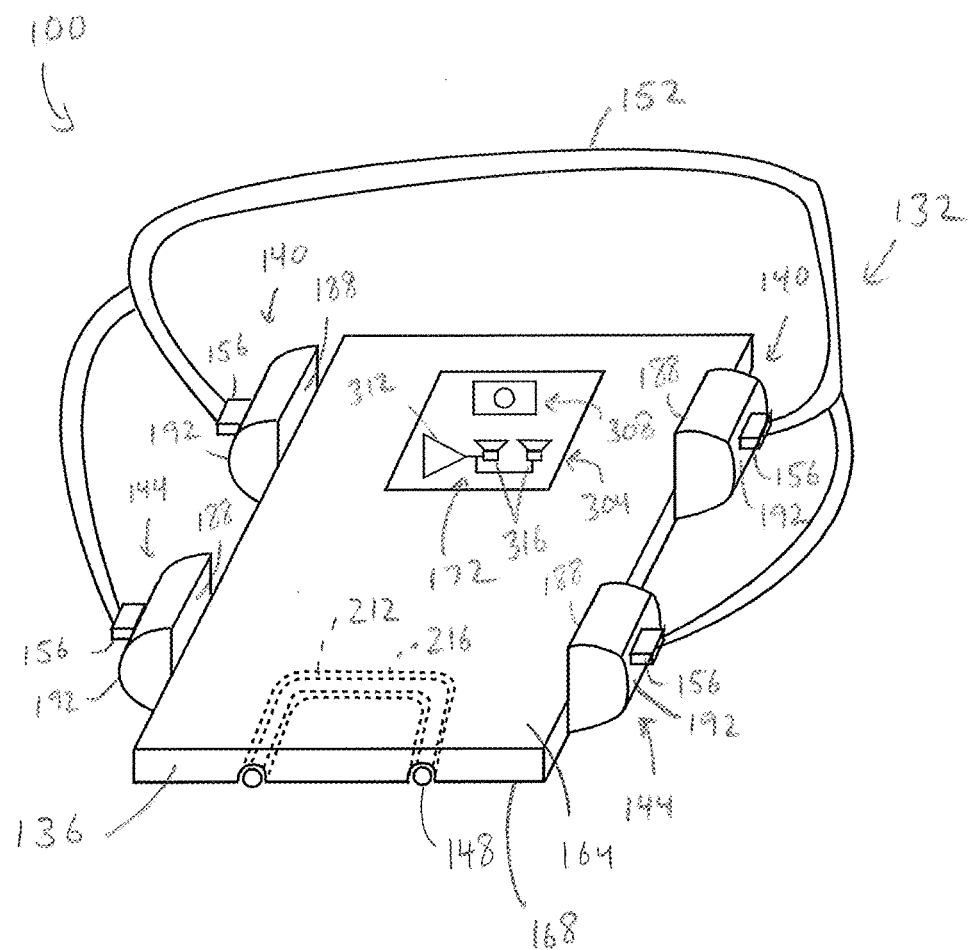
FIG. 2 is a perspective view of the support structure assembly of FIG. 1 with the harness shown connected to the platform and the support bar shown in a retracted position.

Each step structure 140, 144 defines a socket 184 and a support surface 188. The sockets 184 are formed in an outer step surface 192 of the step structures 140, 144. As shown in FIG. 2, each socket 184 is configured to releasably retain one of the connectors 156 of the harness assembly 132. Accordingly, each socket 184 defines a detent (not shown) or other feature configured to releasably retain the connectors 156. It is understood that the connectors 156 and the sockets 184 can have varied configurations that permit firm engagement and easy disengagement.

Figure 3:
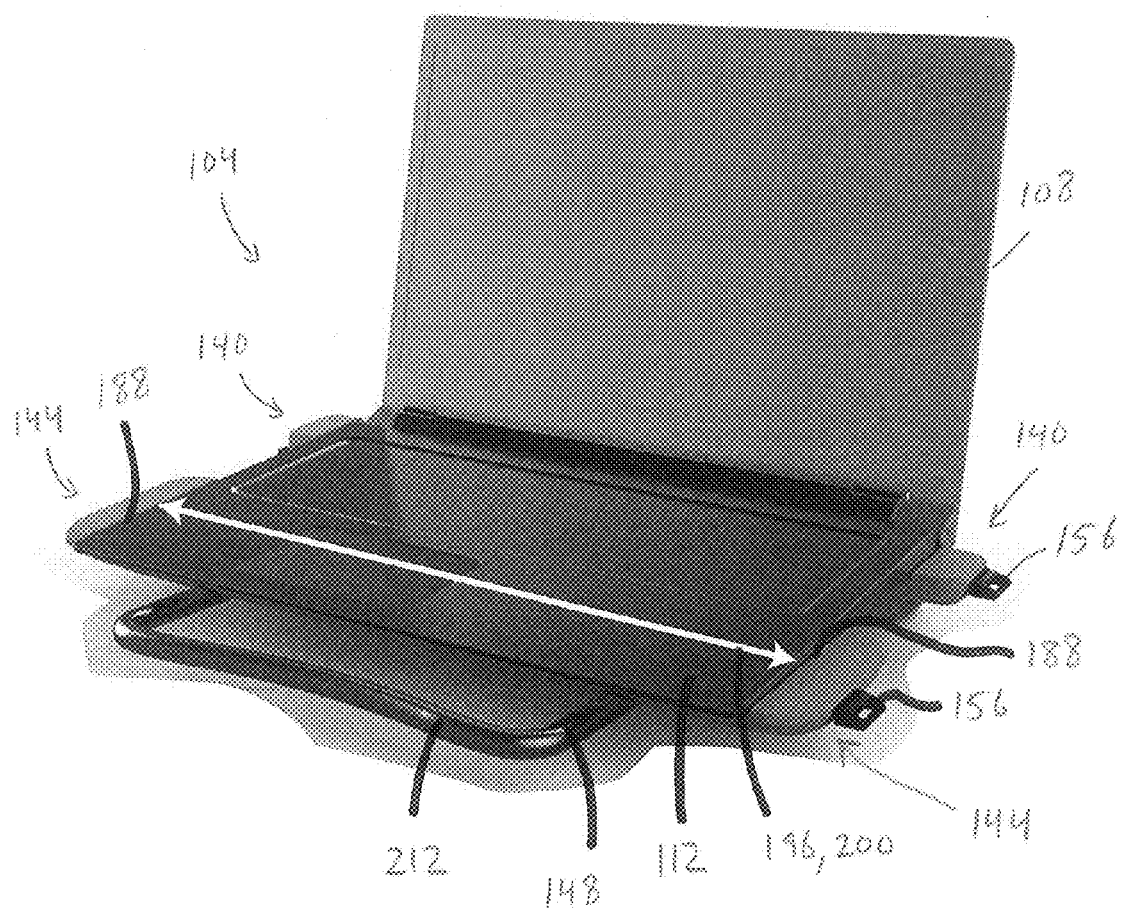
FIG. 3 is a perspective view of the support structure assembly of FIG. 1 showing the computing device supported on the platform.
Figure 4:
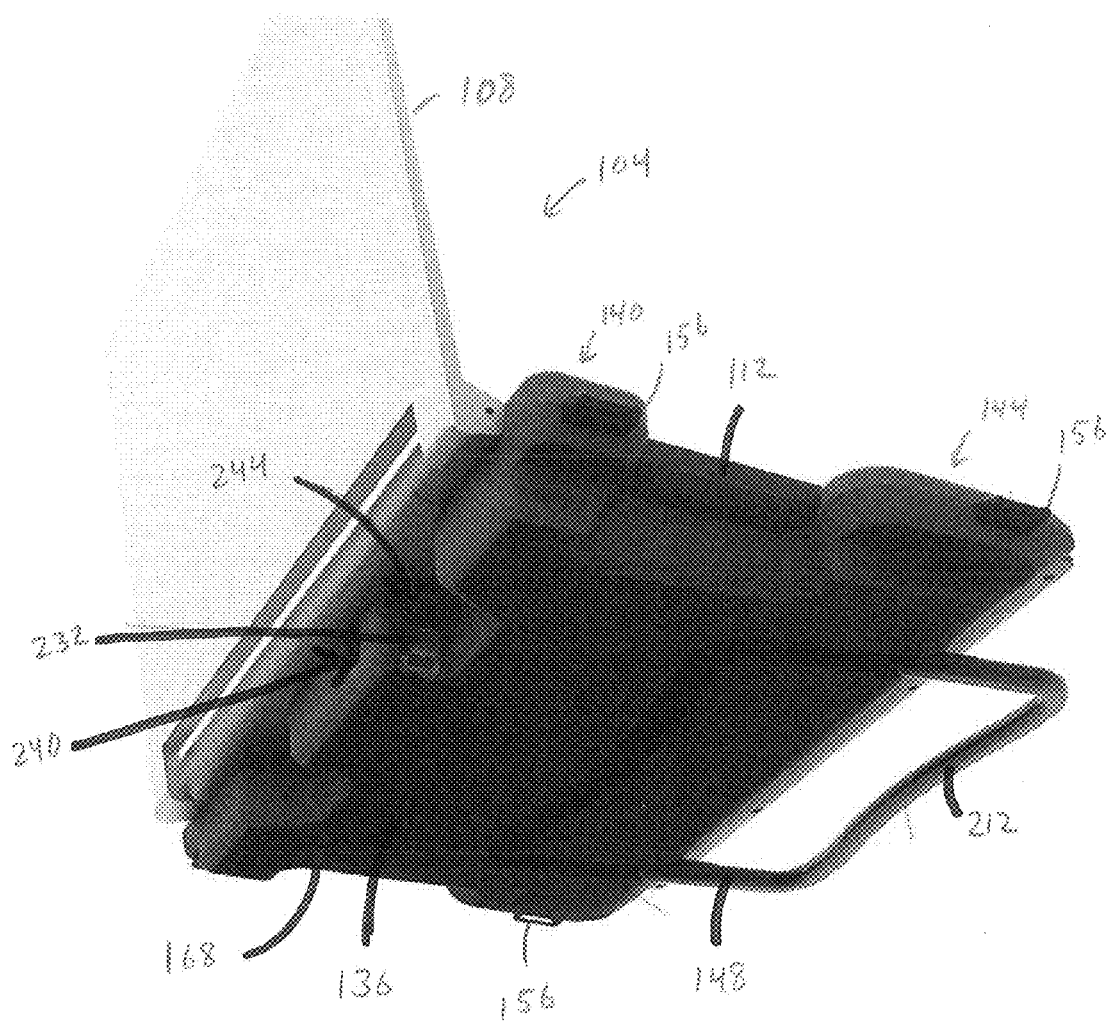
FIG. 4 is a rear perspective view of the support structure assembly of FIG. 1 with the computing device supported on the platform and an undersurface of the platform being shown.

The support surfaces 188 defined by the step structures 140, 144 are opposite from the outer step surfaces 192 and are non-coplanar with the support surface 164 defined by the platform 136. In particular, the support surfaces 188 extend above the support surface 164 so that the laptop 104 is prevented from moving laterally on the platform 136. As shown in FIG. 3, in one embodiment, a distance 196 between the support surfaces 188 is approximately the same as a width 200 (FIG. 3) of the base unit 112 so that the laptop 108 is gripped between the step structures 140, 144. The support surfaces 188 of the step structures 140, 144 may be coated with a high friction coating to further prevent movement of the base unit 112. Also, in another embodiment, additional step structures (not shown) may extend from a rear side 204 (FIG. 1) and/or a front side 208 (FIG. 1) of the platform 136 and define additional support surfaces (not shown) configured to further prevent movement of the laptop 104 relative to the platform 136.

As shown in FIGS. 1 through 4, the support bar 148 includes a support member 212 and is movably connected to the platform 136. In particular, the support bar 148 is configured for movement relative to the platform 136 to an extended position (FIGS. 1, 3, and 4) and a retracted position (FIG. 2, shown partially in phantom). In the retracted position, the support member 212 is configured to be received by a bar recess 216 (shown without the support bar in FIG. 4) that is defined in the undersurface 168 of the platform 136. The bar recess 216 is approximately the same size and shape as the support bar 148. Accordingly, in the retracted position the support member 212 is positioned between the undersurface 168 and the support surface 164. In the extended position, the support member 212 is spaced apart from the bar recess 216. In some embodiments, the bar recess 216 defines a detent (not shown) or other feature that is configured to releasably retain the support bar 148 in the bar recess 216. In the illustrated embodiment, the support bar 148 is pivotably mounted to the platform 136. However, it is contemplated that other engagements may be used such as a sliding engagement.

Figure 6:
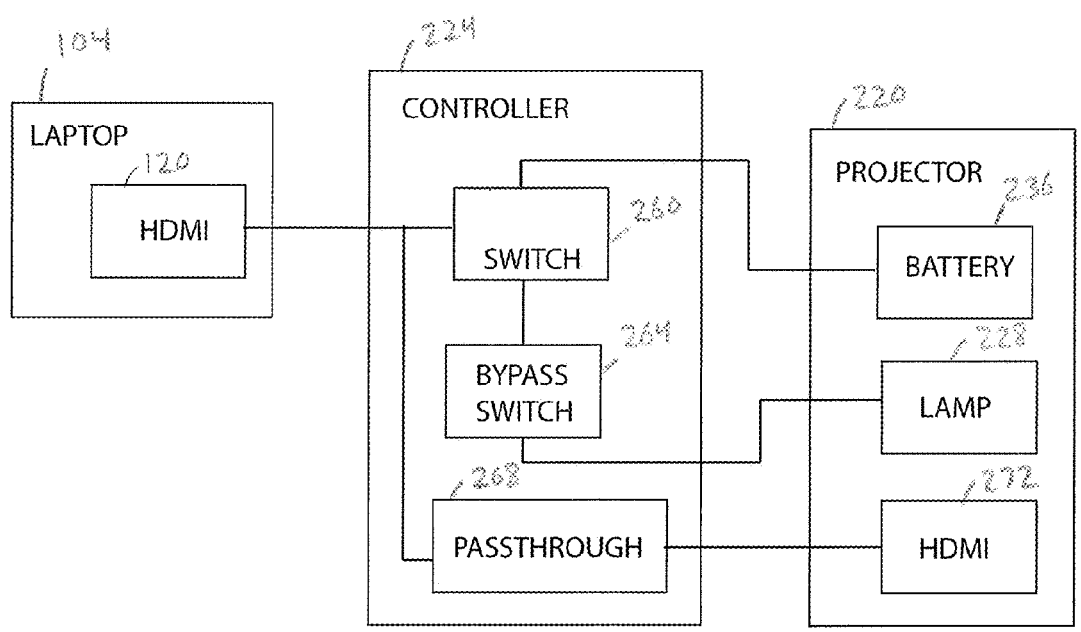
FIG. 6 is a block diagram view of the computing device and also a power controller and a video projector assembly of the support structure assembly of FIG. 1.

The cavity 172 of the platform 136 is configured to receive and support accessories for use with the laptop 104. For example, as shown in FIG. 1, a video projector assembly 220 and a power controller 224 are at least partially positioned in the cavity 172 for support by the platform 136. The video projector assembly 220 is preferably provided as a pico-projector or other "handheld" projector unit including a lamp assembly 228, a focus adjustment mechanism 232 (FIG. 4), and a battery 236 (FIG. 6). The video projector assembly 220 is electrically connectable to the laptop 104 to receive an electrical audio/video signal generated by the laptop. The lamp assembly 228, which is powered by the battery 236, is configured to project an image through an image aperture 240 (FIG. 4) formed in the platform 136. The image aperture 240 is configured to enable the projected image (e.g. a light beam) generated by the video projector assembly 220 to pass through the platform 136 without obstruction. The focus adjustment mechanism 232 is accessible through a focus opening 244 (FIG. 4) defined by the platform 136 to enable focusing of the projected image when the video projector assembly 220 is positioned within the cavity 172. The video projector assembly 220 is configurable to project the same image as displayed on the display screen 108 of the laptop 104. Also, the video projector assembly 220 is configurable to project any desired image including images that are different than what is displayed by the display screen 108. The video projector assembly 220 is connectable to the HDMI port 120 via a suitable cable.

The power controller 224 is also electrically connectable to the HDMI port 120 and the video projector assembly 220. The power controller 224 is configured to automatically activate the video projector assembly 220 when the display screen 108 is in use. In particular, the power controller 224 is configured to supply electrical power from the battery 236 to the lamp assembly 228 in response to detecting that the display screen 108 is active. Furthermore, the power controller 224 is configured to electrically isolate the lamp assembly 228 from the battery 236 in response to detecting that the display screen 108 is inactive. Thus, the power controller 224 is operable to automatically "wake" the video projector assembly 220 when the display screen 108 is in use and to automatically cause the video projector assembly to enter "sleep" or stand-by mode when the display screen is inactive. The power controller 224 is further configured to prevent the video projector assembly 220 from drawing electrical power from the battery 236 when the display screen 108 is inactive, such that the video projector assembly efficiently utilizes the electrical energy stored in the battery.

An embodiment of the power controller 224 is shown in the block diagram of FIG. 6. The power controller 224 is shown as including a switch 260, a bypass switch 264, and a passthrough device 268. The switch 260 is an electrically controllable switch that is configurable in an open state or a closed state. The bypass switch 264 is a user-operated switch (manually operated) that is configurable in an open state or a closed state. The passthrough device 268 is configured to pass signals between the HDMI port 120 and an HDMI port 272 of the video projector assembly 220.

Certain pins of the HDMI port 120 of the laptop 104 are connected to the switch 260 as a control signal. Certain other pins of the HDMI port 120 of the laptop 104 are connected to the passthrough device 268, which is connected to the HDMI port 272 of the video projector assembly 220. The battery 236, the switch 260, the bypass switch 264, and the lamp assembly 228 are connected in series.

Figure 7:
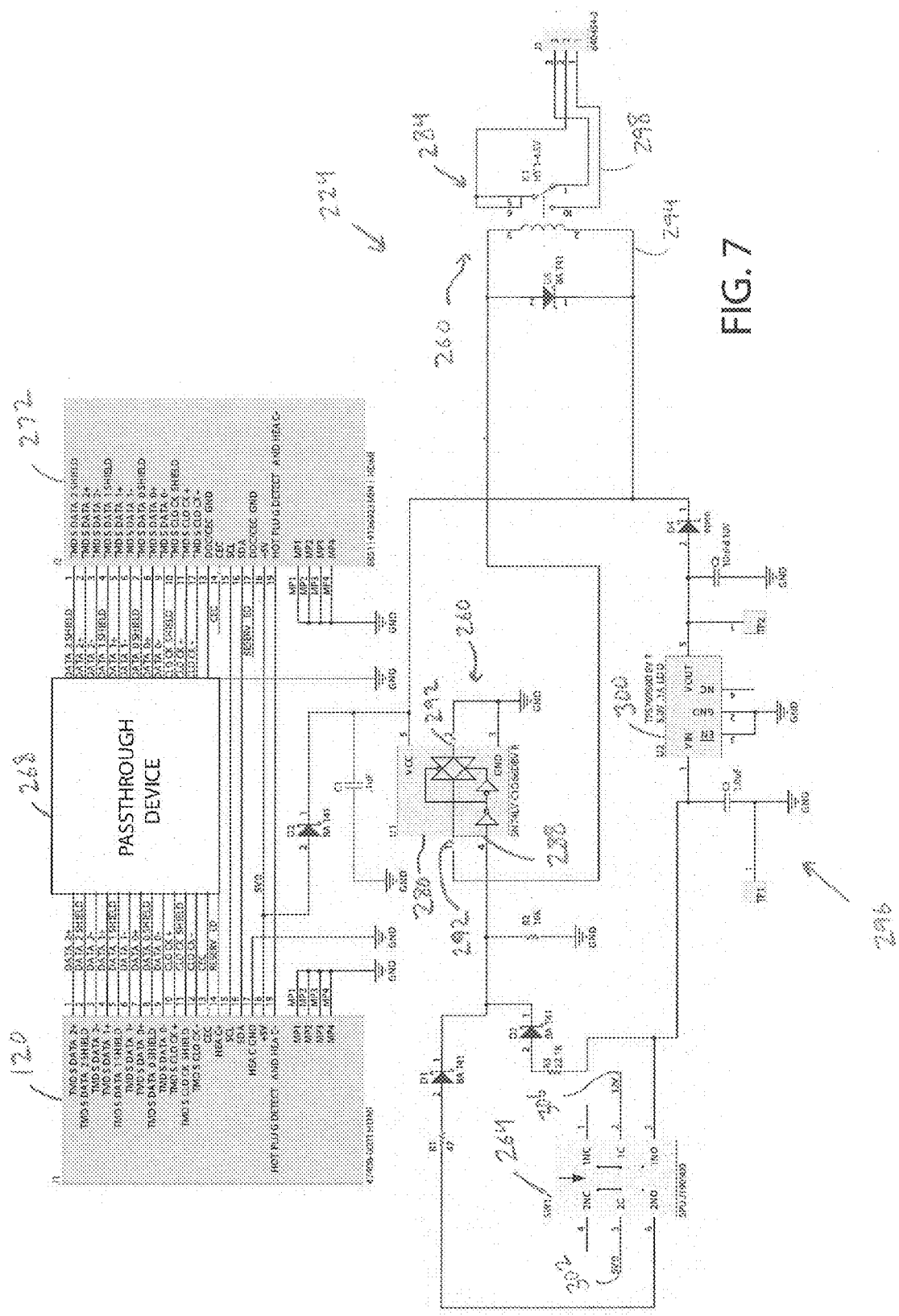
FIG. 7 is a schematic showing selected electrical circuits of the computing device, the power controller, and the video projector assembly.

An exemplary circuit implementation of the power controller 224 is shown in the schematic of FIG. 7, which illustrates the HDMI port 120 of the laptop 104, the HDMI port 272 of the video projector assembly 220, the switch 260, the bypass switch 264, and the passthrough device 268. The switch 260 is implemented with an analog switch 280 and an electromechanical relay 284. The analog switch 280 is provided as a Texas Instruments SN74LVC1G66, which includes a control input 288 and two switched pins 292. The electromechanical relay 284 includes a coil circuit 294 and a switched circuit 298. The bypass switch 264 is provided as a double-pole push switch that is connected to a 5V voltage source 302.

Pin 18 of the HDMI port 120 is energized when the display screen 108 is energized and is configured to supply power to the analog switch 280 and is connected to the coil circuit 294 of the electromechanical relay 284. From the coil circuit 294 the signal from pin 18 is connected to one of the switched pins 292 (left pin in FIG. 7) of the analog switch 280. The other switched pin 292 (right pin in FIG. 7) is connected to ground.

Next, starting from the voltage source 302 connected to the bypass switch 264, the voltage source 302 is selectively connectable to one of the switched pins (pin 6 in FIG. 7) of the bypass switch. From the bypass switch 264, the voltage source 302 is connected to the control input 288 of the analog switch 280.

The closed bypass switch 264 is configured to supply the control input 288 with a voltage signal from the voltage source 302 that causes the analog switch 280 to close, thereby electrically connecting the switched pins 292. In response to the closing of the analog switch 280, the coil circuit 294 is energized and the switched circuit 298 becomes configured to supply the lamp 228 (FIG. 6) of the video projector assembly 220 with electrical energy from the battery 236 (FIG. 6).

When the bypass switch 264 is in the open state, the voltage source 302 is isolated from the control input 288 and the analog switch 280 is in the open state (i.e. the switched pins 292 are electrically isolated). Accordingly, the switched circuit 298 is configured to isolate the lamp 228 (FIG. 6) of the video projector assembly 220 from the electrical energy of the battery 236 (FIG. 6) even when pin 18 of the HDMI port 120 is not energized.

The schematic of FIG. 7 also illustrates a circuit 296 that enables the lamp 228 of the video projector assembly 220 to be supplied with electrical power from the battery 236 even when the display screen 108 of the laptop 104 is inactive. This optional circuit 296 is typically used to activate the video projector assembly 220 when the battery 236 is being charged, for example. The circuit 296 includes a low-dropout (LDO) voltage regulator 300 provided as a Texas Instruments TPS76950, and a charging voltage source 306 connected to the bypass switch 264.

Starting from the voltage source 306, when the bypass switch is closed, the control input 288 and an input (pin 1) of the voltage regulator 300 are supplied with electrical energy from the voltage source 306. The voltage regulator 300 outputs a regulated voltage (5V typically) that supplies power to the analog switch 280 and is connected to the coil circuit 294. From the coil circuit 294 the output of the voltage regulator 300 is connected to one of the switched pins 292 (left pin in FIG. 7) of the analog switch 280. The other switched pin 292 (right pin in FIG. 7) is connected to ground.

Accordingly, when the bypass switch 264 is closed and a charging voltage (i.e. voltage source 306) is present at the bypass switch, the voltage regulator 300 is configured to generate an output voltage signal that is used to power to analog switch 260 and to activate the electromechanical relay 284 even when the 5V signal (pin 18) is unavailable from the HDMI port 120 of the laptop 104 (such as when the display screen 108 is inactive). When the charging voltage is not present at the bypass switch 264, the output of the voltage regulator 300 is zero volts and the electromechanical relay 284 is configured to remain open.

In addition to the video projector assembly 220 other accessories are configured to be positioned in the cavity 172 such as a loudspeaker assembly 304 (FIG. 2) and/or a digital camera assembly 308 (FIG. 2). The loudspeaker assembly 304 is supported by the platform 136 and is located at least partially in the cavity 172. The loudspeaker assembly 304 includes an electrical amplifier 312 and at least two loudspeaker units 316 electrically connected to the amplifier. The amplifier 312 is configured for electrical connection to the audio socket 124 (FIG. 1) of the laptop 104 and is configured to receive and to amplify an electrical audio signal.

The digital camera 308 is supported by the platform 136 and is at least partially located in the cavity 172. The digital camera 308 is configured to take images through the image aperture 240 (FIG. 4) in the platform 136. The digital camera 308 is electrically connectable to a universal serial bus ("USB") port (not shown) of the laptop 104, for example.

Figure 8:
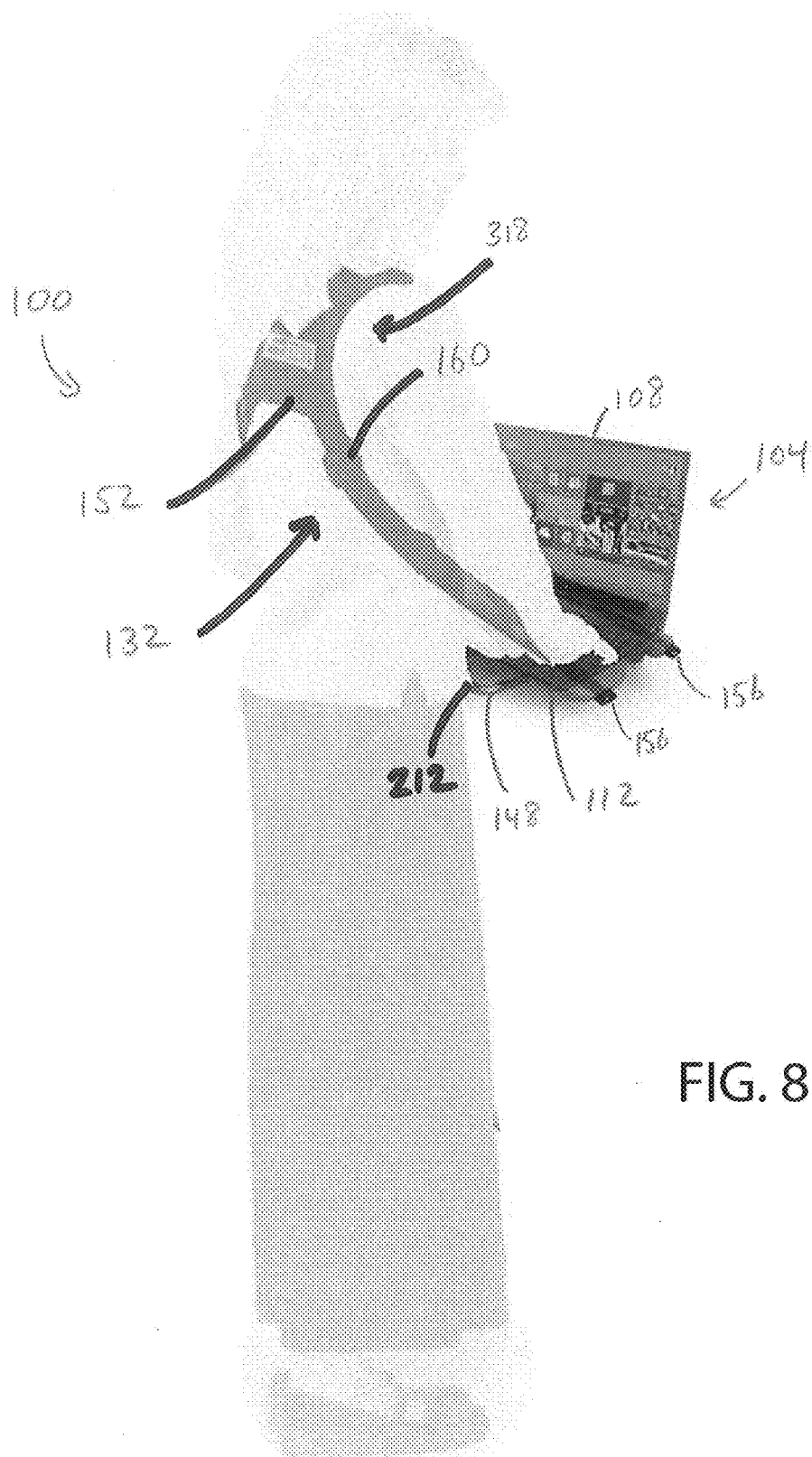
FIG. 8 is a rear perspective view showing the support structure assembly and the computing device in use.
Figure 9:
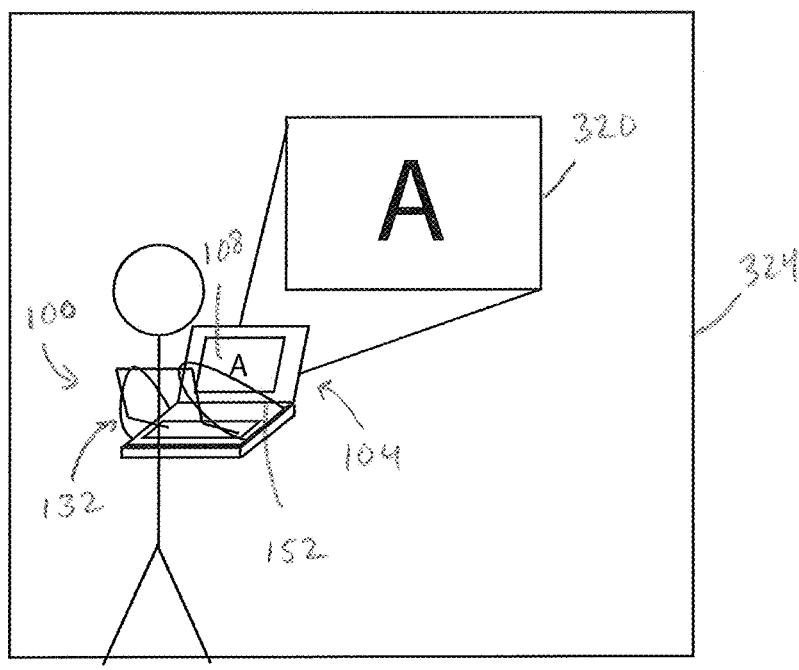
FIG. 9 is a perspective view showing the support structure assembly and the computing device in use and projecting an image on a nearby surface.

As shown in FIGS. 8 and 9, in operation the support structure assembly 100 enables convenient use of the laptop 104 and the video projector assembly 220 when the user is sitting or standing and is away from a support surface, such as a table, desk, or countertop. In FIG. 8, the user has connected the connectors 156 of the harness assembly 132 to the sockets 184 of the step structures 140, 144. The user has also positioned openings 318 defined by the strap 152 of the harness assembly 132 about her shoulders. The laptop 104 is shown as being supported by the support surfaces 164, 188. The support bar 148 is positioned against a midsection of the user to position the keyboard 116 at a comfortable and ergonomic location. The user is able to support the laptop 104 without using her hands so that her hands are available for using input devices connected to the laptop (i.e. the keyboard 104) or other devices. The user is able to walk about with the support structure assembly 110 and the laptop 104, and even traverse difficult terrain (e.g. in an outdoor environment) all without supporting the laptop with her hands, since the support surfaces 164, 188 maintain the laptop in a fixed position relative to the platform 136. During use the laptop 104 is able to cool the CPU, since the step structures 140, 144 are spaced apart from any vents 128 of the laptop.

In FIG. 9, the user has activated the video projector assembly 220 and has displayed a projected image 320 on a nearby flat surface, such as a wall 324. Accordingly, the user is able to easily display information for another person or even a group of people without requiring those people to view the display screen 108, which is relatively small and may be inconveniently oriented for viewing by people other than the user. In one embodiment, the output of the video projector assembly 220 can be made as a large as about eighty inches on the diagonal and full high-definition video (1080P) may be displayed. The video projector assembly 220 is useful for medical assistants that may desire to update a patient's chart while the patient and/or a doctor are speaking. The user does not require a separate support surface and may choose to display the data being entered on a nearby wall for approval and proofing by the doctor and/or the patient. However, it can be appreciated that the platform 136 is configured to rest on a separate support surface as desired. To that end, the undersurface 168 may be provided with pads or feet (not shown).

Figure 10:
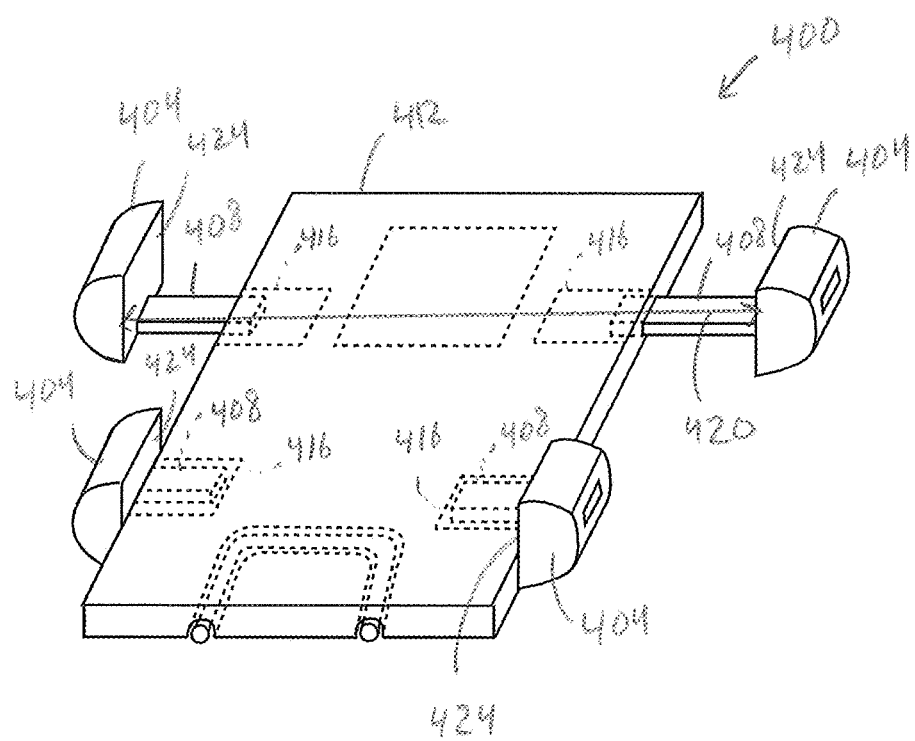
FIG. 10 is a perspective view of another embodiment of a support structure assembly including step structures for supporting a laptop that are adjustable in position along an axis.

As shown in FIG. 10, in another embodiment of the support structure assembly 400, step structures 404 extend from support members 408 that are movably received by a platform 412. In particular, each support member 408 is positionable within a corresponding cavity 416 formed in the platform 412. A corresponding set screw (not shown) or like fastener may be provided to fix the position of each support member 408 relative to the platform 412. In the illustrated embodiment, the step structures 404 are movable relative to the platform 412 such that a distance 420 between support surfaces 424 is selectable, thereby making the support structure assembly 400 usable with an even greater number of laptops. Specifically, the distance 420 is selectable to correspond to the width 200 (FIG. 3) of the laptop 104 such that a laptop of any typically available width is supportable on the platform 136.

Figure 11:
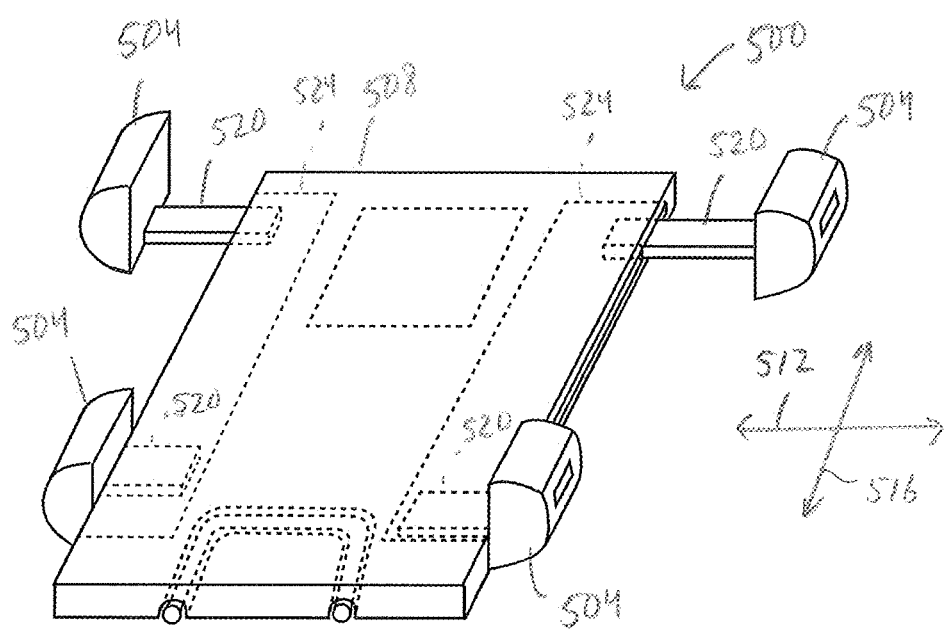
FIG. 11 is a perspective view of yet another embodiment of a support structure assembly including step structures for supporting a laptop that are adjustable in position along two axes.

With reference to FIG. 11, in yet another embodiment of the support structure assembly 500, step structures 504 are movable relative to a platform 508 about two axes 512, 516. As in the embodiment of FIG. 10, the step structures 504 extend from support members 520 that are movably received by the platform 508. In the embodiment of FIG. 11, cavities 524 are formed that are much wider than the support members 520, such that the support members are movable about the axis 512 and the axis 516 that is perpendicular to the axis 512. Each support member 520 is fixedly positionable in any position within the corresponding cavity 524.

The step structures 504 are positionable about the axis 512 to accommodate laptops of any typically available width 200 (FIG. 3). Additionally, the step structures 504 are positionable about the axis 516 to ensure that the step structures 504 are spaced apart from any vents 128, ports 120, 124, disk drives, and the like that may be formed on the base unit 112 of the laptop 104.

Figure 12:
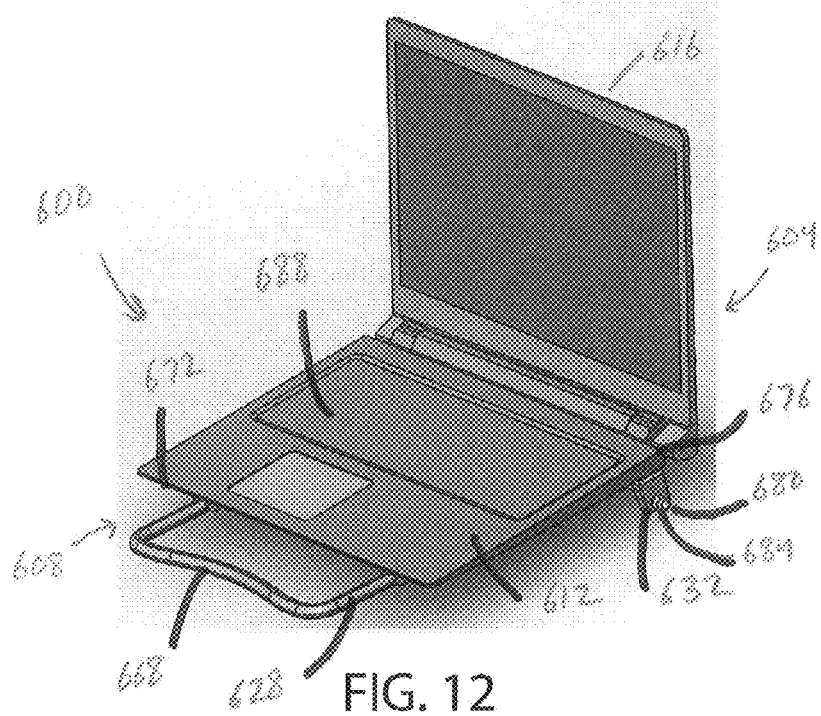
FIG. 12 is a perspective view of a further embodiment of a support structure assembly and a portable computing device supported by the support structure assembly.
Figure 13:
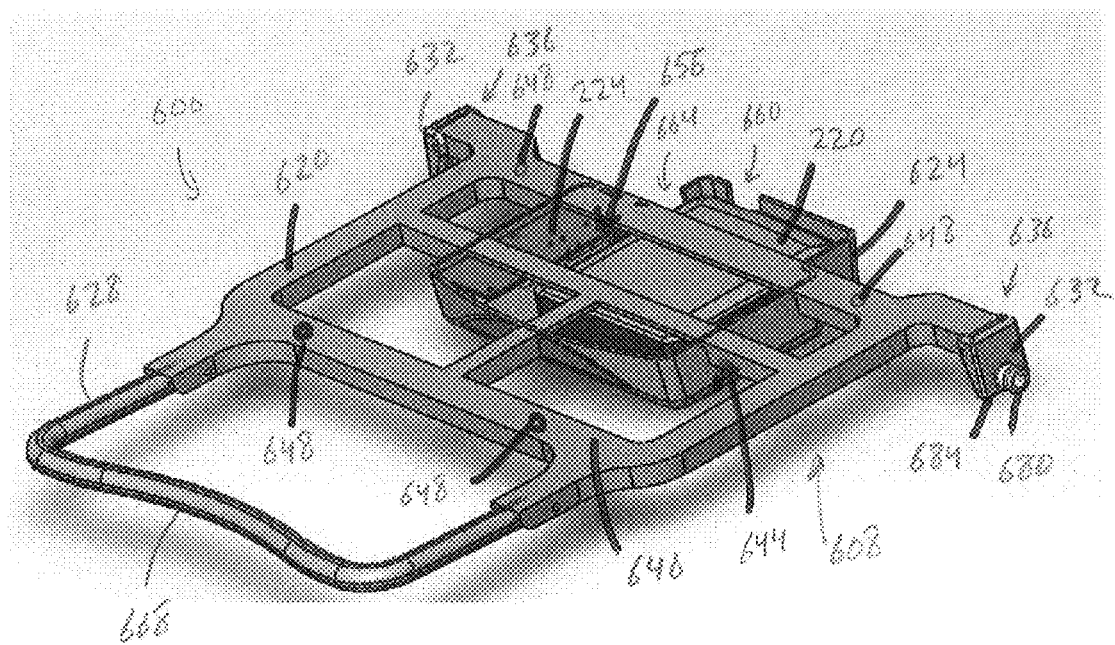
FIG. 13 is a perspective view of the support structure assembly of FIG. 12 showing a frame, a support bar in an extended position, and a cartridge assembly connected to the frame, a video projector assembly and a power controller are supported by the cartridge assembly.
Figure 14:
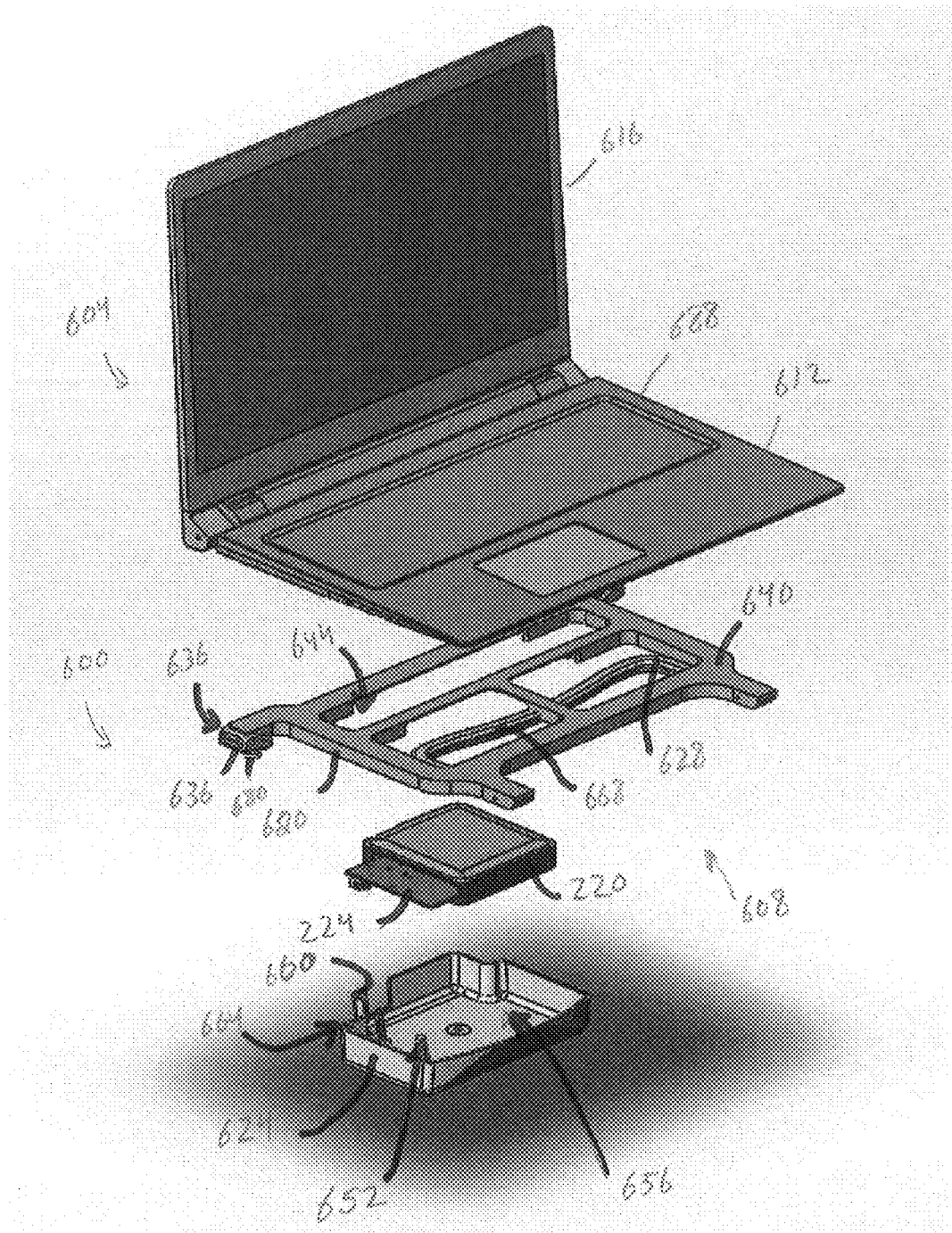
FIG. 14 is an exploded perspective view of the support structure assembly and the computing device of FIG. 12.

As shown in FIGS. 12-14, another embodiment of the support structure assembly 600 includes a laptop 604 and a support structure 608. The laptop 604 is substantially identical to the laptop 104 and includes all of the same parts, components, and features including a base unit 612 and a display screen 616. The support structure 608 includes a harness assembly (not shown, substantially identical to the harness assembly 132 (FIG. 1)), a frame 620, a cartridge assembly 624, a support bar 628, a plurality of attachment assemblies 632, a plurality of hinge structures 636, the video projector assembly 220, and the power controller 224.

With reference to FIG. 13, the frame 620 defines a support surface 640 and includes a connection structure 644. The support surface 640 is configured to support the base unit 612 of the laptop 104. In particular, the frame 620 is configured to be fixedly connected to the base unit 612 of the laptop 604. In one embodiment, the frame 620 defines openings 648, each configured to receive a fastener (not shown) that extends through a corresponding opening 648 and into a corresponding opening (not shown) formed in the base unit 612 of the laptop 604. Accordingly, the frame 620 is connectable to any laptop independent of the width 200 (FIG. 3) or size of the base unit 612. In other embodiments, the frame 620 is integrally formed with the base unit 612 as a monolithic part, the frame is attached to the base unit with an adhesive, or the frame connected to the base unit with any desired structure and process.

Figure 15:
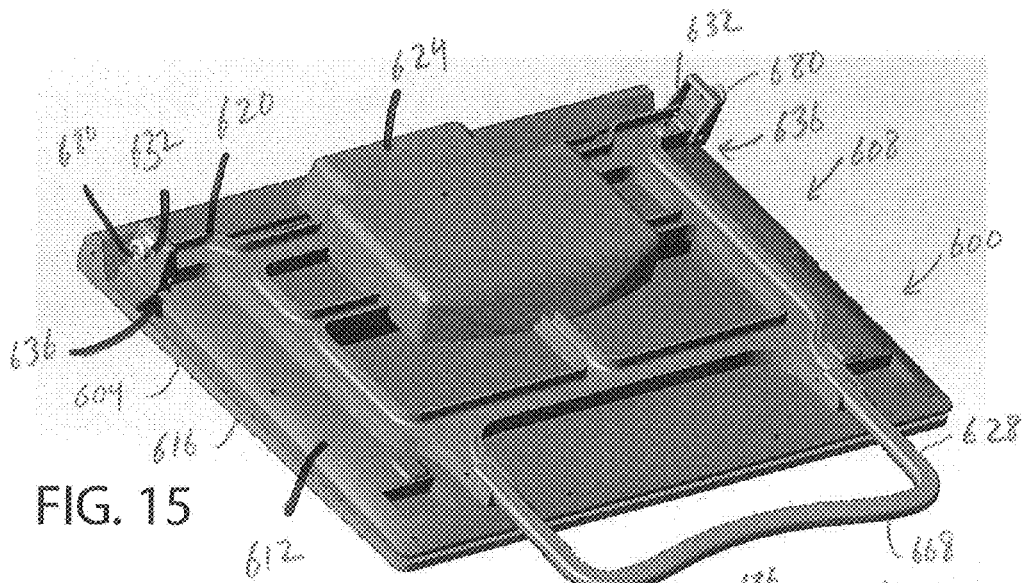
FIG. 15 is a bottom perspective view of the support structure assembly and the computing device of FIG. 12 with the support bar in the extended position and two attachment assemblies in an extended position.
Figure 16:
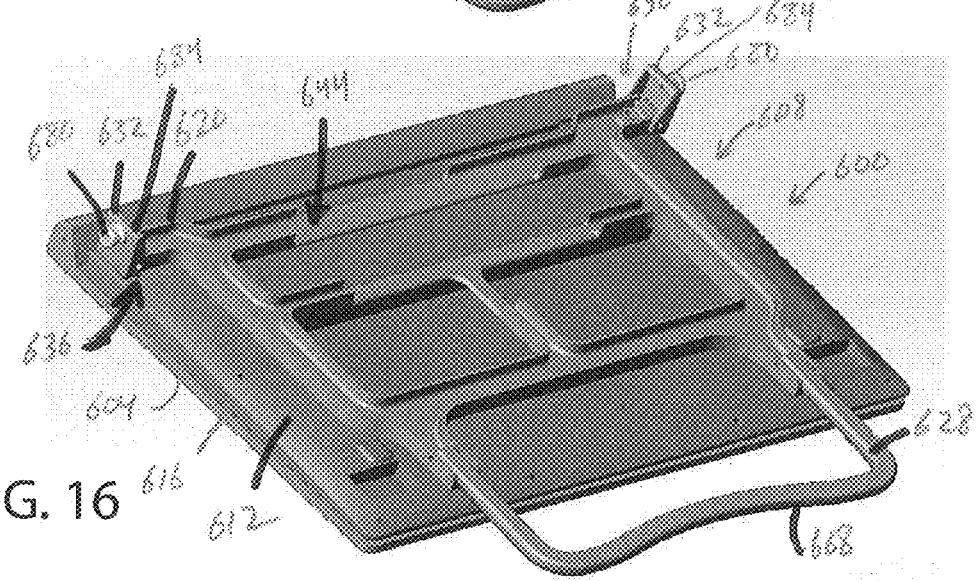
FIG. 16 is another bottom perspective view of the support structure assembly and the computing device of FIG. 12 with the cartridge assembly removed from the frame.

As shown in FIG. 14, the cartridge assembly 624 includes a connection structure 652 and defines an accessory cavity 656, an image aperture 660, and a focus opening 664. The connection structure 652 is configured to be releasably retained by the connection structure 644 of the frame 620 to connect the cartridge assembly 624 to the frame. The connection structures 644, 652 are provided as any desired type of connection structures. Additionally, fasteners (not shown) may extend through the cartridge assembly 624 and into the frame 620 to connect the cartridge assembly to the frame. The cartridge assembly 624 is shown disconnected from the frame 620 in FIGS. 14, 16, and 17 and is shown connected to the frame in FIGS. 13 and 15. In one embodiment, a lock assembly (not shown) is provided that prevents disconnection of the cartridge assembly 624 from the frame 620 without a key or other release mechanism (not shown).

The accessory cavity 656 is configured to receive and to support an accessory, such as any accessory for use with the laptop. As shown in FIG. 13, the video projector assembly 220 and the power controller 224 are positionable in the accessory cavity 656. Additionally, the loudspeaker assembly 304 and/or the digital camera 308 are positioned in the accessory cavity 656. When the cartridge assembly 624 is connected to the frame 620, the accessory cavity 656 is defined in part by the cartridge assembly, in part by the frame, and in part by the base unit 612 of the laptop 604. Typically, the accessories within the accessory cavity 656 are not removable from the accessory cavity when the cartridge assembly 624 is connected to the frame 620.

The image aperture 660 is an opening formed in the cartridge assembly 624 that is configured to align with the lamp assembly 228 of the video projector assembly 220 when the video projector assembly is positioned in the accessory cavity 656 and the cartridge assembly is connected to the frame 620. The image aperture 660 enables the image projected by the lamp assembly 228 to exit the accessory cavity 656.

The focus opening 664 is an opening formed in the cartridge assembly 624 through which the focus adjustment mechanism 232 of the video projector assembly 220 is accessible to a user when the video projector assembly is positioned in the accessory cavity 656 and the cartridge assembly is connected to the frame 620. The focus opening 664 is configured to enable a user to access the focus adjustment mechanism 232 of the video projector assembly 220 so that the projected image is easily focused.

Figure 17:
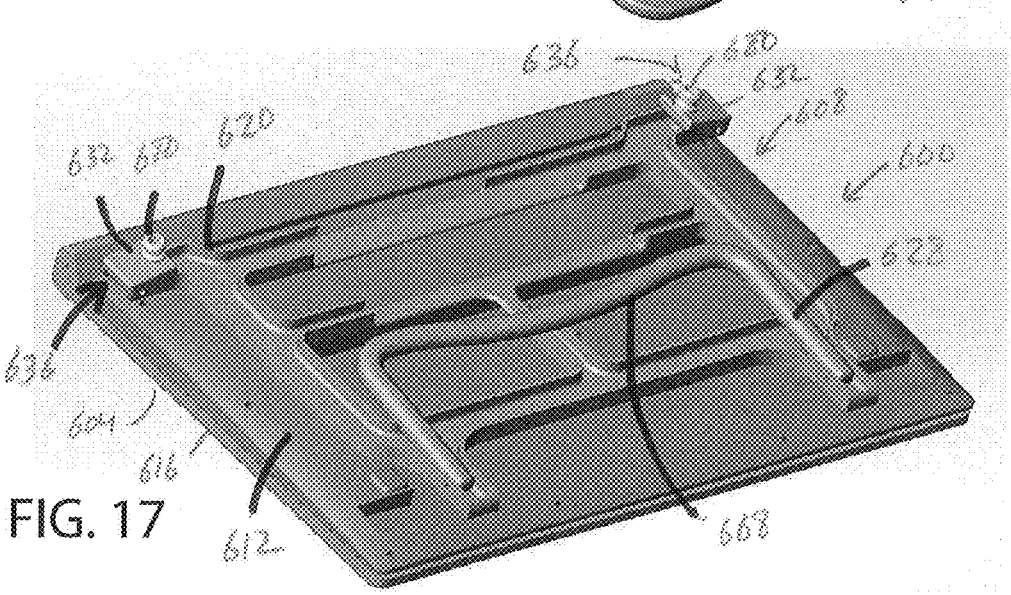
FIG. 17 is yet another bottom perspective view of the support structure assembly and the computing device of FIG. 12 with the cartridge assembly removed from the frame and the support bar in a retracted position.

The support bar 628 is connected to the frame 620 and is configured for movement between an extended position (FIGS. 12, 13, 15, and 16) and a retracted position (FIGS. 14 and 17). The support bar 628, which is substantially identical to the support bar 148, includes a support member 668. In the extended position the support member 668 is positioned in front of a front edge 672 (FIG. 12) and a rear edge 676 (FIG. 12) of the laptop 604, so that the support member is positionable against the midsection of the user. In the retracted position the support member 668 is positioned between the front edge 672 and the rear edge 676.

As shown in FIG. 13, the attachment assemblies 632 extend from the frame 620 and each includes an attachment structure 680 that is configured to releasably retain a corresponding connector 156 of the harness assembly 132.

The hinge structures 636 are each connected to the frame 620 and to a corresponding one of the attachment assemblies 632. The hinge structures 636 are configured to enable movement of each attachment assembly 632 to an extended position (FIGS. 12, 13, 15, and 16) and a retracted position (FIGS. 14 and 17). In the extended position, a ground engaging surface 684 (FIG. 13) of each attachment assembly 632 is configured to support the frame 620 in a position that makes use of a keyboard 688 of the laptop 604 ergonomic and comfortable. Also, in the extended position, the attachment structures 680 are available for connection to the connectors 156 of the harness assembly 132. The attachment assemblies 632 are also useful for adjusting the height of the projected image. That is, the projected image is raised when the attachment assemblies 632 are in the extended position, and the projected image is lowered when the attachment assemblies are in the retracted position.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A support structure assembly for supporting a portable computing device comprising: a harness assembly including a strap and a plurality of connectors extending from said strap; a platform defining a first support surface configured to support the portable computing device; two first step structures extending from said platform and located at opposite ends of said first support surface, each first step structure defining (i) a first socket formed in a first outer step surface and configured to releasably retain a connector of said plurality of connectors, and (ii) a second support surface opposite from said first outer step surface, non-coplanar with said first support surface, and configured to support the portable computing device; and a support bar connected to said platform; the support structure assembly, further comprising: two second step structures extending from said platform, located at opposite ends of said first support surface, and spaced apart from said first step structures, each second step structure defining (i) a second socket formed in a second outer step surface and configured to releasably retain a connector of said plurality of connectors, and (ii) a third support surface opposite from said second outer step surface, non-coplanar with said first support surface, and configured to support the portable computing device; wherein at least one of said two first step structures is slidably movable relative to said platform, such that a first distance between said second support surfaces is selectable, and at least one of said two second step structures is slidably movable relative to said platform, such that a second distance between said third support surfaces is selectable.

2. The support structure assembly of claim 1, wherein:
said platform defines an undersurface opposite said first support surface, and
said platform further defines a cavity located between said first support surface and said undersurface.

3. The support structure assembly of claim 2, further comprising: a digital camera assembly supported by said platform, located at least partially in said cavity, and electrically connectable to an output of said portable computing device.

4. The support structure assembly of claim 2, further comprising: a video projector assembly supported by said platform, located at least partially in said cavity, and configured to project a projected image through an image aperture in said platform, said video projector assembly electrically connectable to the portable computing device to receive an electrical video signal generated by the portable computing device.

5. The support structure assembly of claim 4, further comprising: a power controller supported by said platform and electrically connected to said video projector assembly and the portable computing device, said power controller configured to supply electrical power to a lamp assembly of said video projector assembly in response to detecting that a display screen of the portable computing device is active and to electrically isolate said lamp assembly from said electrical power in response to detecting that the display screen is inactive.

6. The support structure assembly of claim 5, wherein said electrical power is supplied by a battery supported by said video projector assembly.

7. The support structure assembly of claim 4, wherein:
said video projector assembly includes a focus adjustment mechanism, and
said platform defines a focus opening through which said focus adjustment mechanism is accessible to a user to enable focusing of said projected image when said video projector assembly is supported by said platform and located at least partially in said cavity.

8. The support structure assembly of claim 2, further comprising: a loudspeaker assembly supported by said platform, located at least partially in said cavity, and electrically connectable to said portable computing device to receive an electrical audio signal generated by the portable computing device.

9. The support structure assembly of claim 8, wherein:
said loudspeaker assembly further includes an electrical amplifier assembly and at least two loudspeaker units electrically connected to said amplifier assembly, and
said amplifier assembly is configured to receive and amplify said electrical audio signal.

10. The support structure assembly of claim 1, wherein:
the support bar is configured for movement to an extended position and a retracted position,
in said retracted position a support member of said support bar is configured to be received by a bar recess defined by an undersurface of said platform located opposite of said first support surface, and said support member is positioned between said first support surface and said undersurface, and
in said extended position said support member is spaced apart from said bar recess.

\* \* \* \* \*